US012325583B2

(12) United States Patent
Barry

(10) Patent No.: US 12,325,583 B2
(45) **Date of Patent: *Jun. 10, 2025**

(54) TRASH CAN WITH AUTO LID LOCKING MECHANISM

(71) Applicant: Krista Barry, Los Angeles, CA (US)

(72) Inventor: Krista Barry, Los Angeles, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/909,748

(22) PCT Filed: Mar. 13, 2021

(86) PCT No.: PCT/US2021/022253

§ 371 (c)(1),
(2) Date: Sep. 6, 2022

(87) PCT Pub. No.: WO2021/183982

PCT Pub. Date: Sep. 16, 2021

(65) Prior Publication Data

US 2023/0104137 A1 Apr. 6, 2023

Related U.S. Application Data

(63) Continuation of application No. 16/818,581, filed on Mar. 13, 2020, now Pat. No. 10,906,738.

(60) Provisional application No. 62/817,848, filed on Mar. 13, 2019.

(51) Int. Cl.
*F17C 1/00* (2006.01)
*B65F 1/16* (2006.01)

(52) U.S. Cl.
CPC ............ *B65F 1/1615* (2013.01); *B65F 1/163* (2013.01); *B65F 2001/1661* (2013.01)

(58) Field of Classification Search
CPC . B65F 1/1615; B65F 1/163; B65F 2001/1661
USPC ........ 220/827, 495.01, 908, 908.1, 263, 264
See application file for complete search history.

(56) References Cited

U.S. PATENT DOCUMENTS 4,119,240 A * 10/1978 Dumas .................. B65F 1/1646 220/812
4,279,357 A 7/1981 Robinson
4,577,262 A * 3/1986 Buteaux .................... B63C 9/22 362/208
5,163,574 A 11/1992 Sosan
5,372,271 A 12/1994 Miller et al.
5,984,134 A 11/1999 Mario
(Continued)

*Primary Examiner* — Don M Anderson
*Assistant Examiner* — Elizabeth J Volz

(57) ABSTRACT

A trash with an auto lid locking mechanism is designed to prevent accidental or unwanted exposure to waste and potentially hazardous material by humans, household pets and stray animals. In some embodiments, the lid of the trash can opens only when a force is continuously applied to the foot pedal of the trach can, and the lid automatically closes and locks when the force on foot pedal discontinues. In some embodiments, the trash can has an internal pulling force for the lid and does not rely on the weight (i.e., gravitational force) of the lid for it to close, thus the lid can still close automatically or remain closed even if the trash can is being knocked down and/or not in an upright position. In some embodiments, the foot pedal recesses and conceals within the trash can body, hereby making it more difficult for animals to step or continuously press on the pedal.

11 Claims, 4 Drawing Sheets

(56) References Cited

U.S. PATENT DOCUMENTS

| | | | | |
|---|---|---|---|---|
| 6,345,725 | B1 | 2/2002 | Lin | |
| 6,390,321 | B1 | 5/2002 | Wang | |
| 6,733,053 | B2 | 5/2004 | Hodge et al. | |
| 6,902,081 | B2 | 6/2005 | Walker | |
| 7,086,557 | B2 | 8/2006 | Miller et al. | |
| 7,121,421 | B2 | 10/2006 | Yang et al. | |
| 7,559,433 | B2 | 7/2009 | Yang et al. | |
| 7,806,285 | B2 | 10/2010 | Yang et al. | |
| 7,950,543 | B2 | 5/2011 | Yang et al. | |
| 7,987,528 | B1 | 8/2011 | Ross | |
| 8,074,833 | B2 | 12/2011 | Yang et al. | |
| 8,136,688 | B2 | 3/2012 | Lee et al. | |
| 8,240,499 | B2 * | 8/2012 | Lu | B65F 1/163 220/264 |
| 8,408,607 | B2 | 4/2013 | Michael et al. | |
| 8,479,944 | B2 | 7/2013 | Moore | |
| 8,678,219 | B1 | 3/2014 | Wang et al. | |
| 9,573,759 | B2 | 2/2017 | Yang et al. | |
| 9,790,025 | B2 | 10/2017 | Yang et al. | |
| 10,906,738 | B2 * | 2/2021 | Barry | B65F 1/1615 |
| 2007/0125792 | A1 * | 6/2007 | Pollack | B65F 1/1615 604/385.13 |

* cited by examiner

| ITEM NO. | PART NUMBER | QTY. |
|---|---|---|
| 1 | FOOT PEDAL | 1 |
| 2 | LINK | 1 |
| 3 | PIN, PEDAL | 1 |
| 4 | HINGE | 1 |
| 5 | PIN, HINGE | 1 |
| 6 | LINK LEVER STOP | 1 |
| 7 | STRIKE PLATE | 1 |
| 8 | LATCH ASSY | 1 |
| 9 | WIRE | 1 |
| 10 | LEVER | 1 |
| 11 | Hook | 1 |
| 12 | Lid | 1 |
| 13 | Can (Body) | 1 |
| 14 | Spring | 1 |

| ITEM NO. | PART NUMBER | QTY. |
|---|---|---|
| 1 | FOOT PEDAL | 1 |
| 2 | LINK | 1 |
| 3 | PIN, PEDAL | 1 |
| 4 | HINGE | 1 |
| 5 | PIN, HINGE | 1 |
| 6 | LINK LEVER STOP | 1 |
| 7 | STRIKE PLATE | 1 |
| 8 | LATCH ASSY | 1 |
| 9 | WIRE | 1 |
| 10 | LEVER | 1 |

| ITEM NO. | PART NUMBER | QTY. |
|---|---|---|
| 1 | FOOT PEDAL | 1 |
| 2 | LINK | 1 |
| 3 | PIN, PEDAL | 1 |
| 4 | HINGE | 1 |
| 5 | PIN, HINGE | 1 |
| 6 | LINK LEVER STOP | 1 |
| 7 | STRIKE PLATE | 1 |
| 8 | LATCH ASSY | 1 |
| 9 | WIRE | 1 |
| 10 | LEVER | 1 |
| 11 | Hook | 1 |
| 12 | Lid | 1 |
| 13 | Can (Body) | 1 |
| 14 | Spring | 1 |

Krista Barry

TITLE: TRASHCANT MECHANSM

SIZE B DWG. NO. TRASHCANT REV -

SCALE: SHEET 3 OF 4

| ITEM NO. | PART NUMBER | QTY. |
|---|---|---|
| 1 | FOOT PEDAL | 1 |
| 2 | LINK | 1 |
| 3 | PIN, PEDAL | 1 |
| 4 | HINGE | 1 |
| 5 | PIN, HINGE | 1 |
| 6 | LINK LEVER STOP | 1 |
| 7 | STRIKE PLATE | 1 |
| 8 | LATCH ASSY | 1 |
| 9 | WIRE | 1 |
| 10 | LEVER | 1 |

TRASH CAN WITH AUTO LID LOCKING MECHANISM

CROSS-REFERENCE TO RELATED PATENT APPLICATIONS

This application is a U.S. national stage of PCT International Patent Application No. PCT/US2021/022253 having an international filing date of Mar. 13, 2021, which claims the benefit of U.S. application Ser. No. 16/818,581 filed Mar. 13, 2020, now U.S. Pat. No. 10,906,738, which claims the benefit of U.S. Provisional Patent Application No. 62/817,848 filed Mar. 13, 1019.

BACKGROUND OF THE INVENTION

Trash cans are commonly used in households, offices, medical facilities and the like to dispose of waste materials. A problem faced by use of conventional trash cans with conventional lids is a potential for unwanted exposure and access to the waste material by persons and household pets.

Embodiments of the present invention relate to trash can or waste container. More specifically, the present disclosure provides a trash can with an auto lid locking mechanism intended to prevent, e.g., animals, household pets, children, stray animals, the mentally handicapped, vandals, etc. from accessing or otherwise be exposed to the contents of the trash can, such as spoiled food and harmful waste materials disposed in the can, or tipping of the can due to wind, animals or humans, and potential spillage of waste materials due to accidental contact; thereby preventing unwanted spillage of potentially harmful waste materials in households, laboratory, clean-room or hospital environments, etc.

SUMMARY OF THE DISCLOSURE

An objective of the present disclosure is to prevent unwanted exposure by humans, household pets and stray animals to harmful waste materials. Another objective of the present disclosure is to prevent accidental and unwanted spillage of waste and trash on indoor and outdoor surfaces resulting from tipping of the trash can by accident, through wind or on purpose. Yet another object of the invention is to secure industrial and medical waste from escaping to the environment or otherwise cause contamination in contained environments such as laboratories, clean-rooms and hospitals.

In summary, the disclosed trash can is configured and designed so that the lid of the trash can opens only when a force is continuously applied to the foot pedal of the trach can, and the lid automatically closes and locks when the force on foot pedal discontinues. The disclosed trash can is designed to have an internal pulling force for the lid and does not rely on the weight (i.e., gravitational force) of the lid for it to close, thus the lid can still close automatically or remain closed even if the trash can is being knocked down and/or not in an upright position.

In one embodiment of the present disclosure, the foot pedal is designed to recess and conceal within the trash can body, thereby making it more difficult for animals to step or continuously press on the pedal. The foot pedal will lift an elongated link member (e.g., a vertical rod) when depressed. The elongated link member is attached to a pivot located within a hinge that will change the direction of movement of a wire from push to pull. The wire will be attached to the pivot to the latch which needs a pull motion to activate and release the latch to allow the lid to open.

In another embodiment of the present disclosure, the elongated link member has a horizontal loop attached to it with a hole. Through this hole a second rod will have a two 90 degree bends the first ¼" horizontal and the second horizontal this will pass through the horizontal loop with a gap equal to the amount of movement required to release the latch. The second rod will then be attached to the lid to allow for the lid to open. The reason for the gap is so when the pedal is depressed the first rod will pull the latch open and with the gap the second rod is free to open the lid. When releasing the pedal, the first thing to happen is the lid is closed and because of the gap the latch is released to lock the lid.

These and other features, aspects and advantages of the present invention will become better understood with reference to the following drawings, description and claims.

DETAILED DESCRIPTION OF PREFERRED EMBODIMENTS

Figure 1:
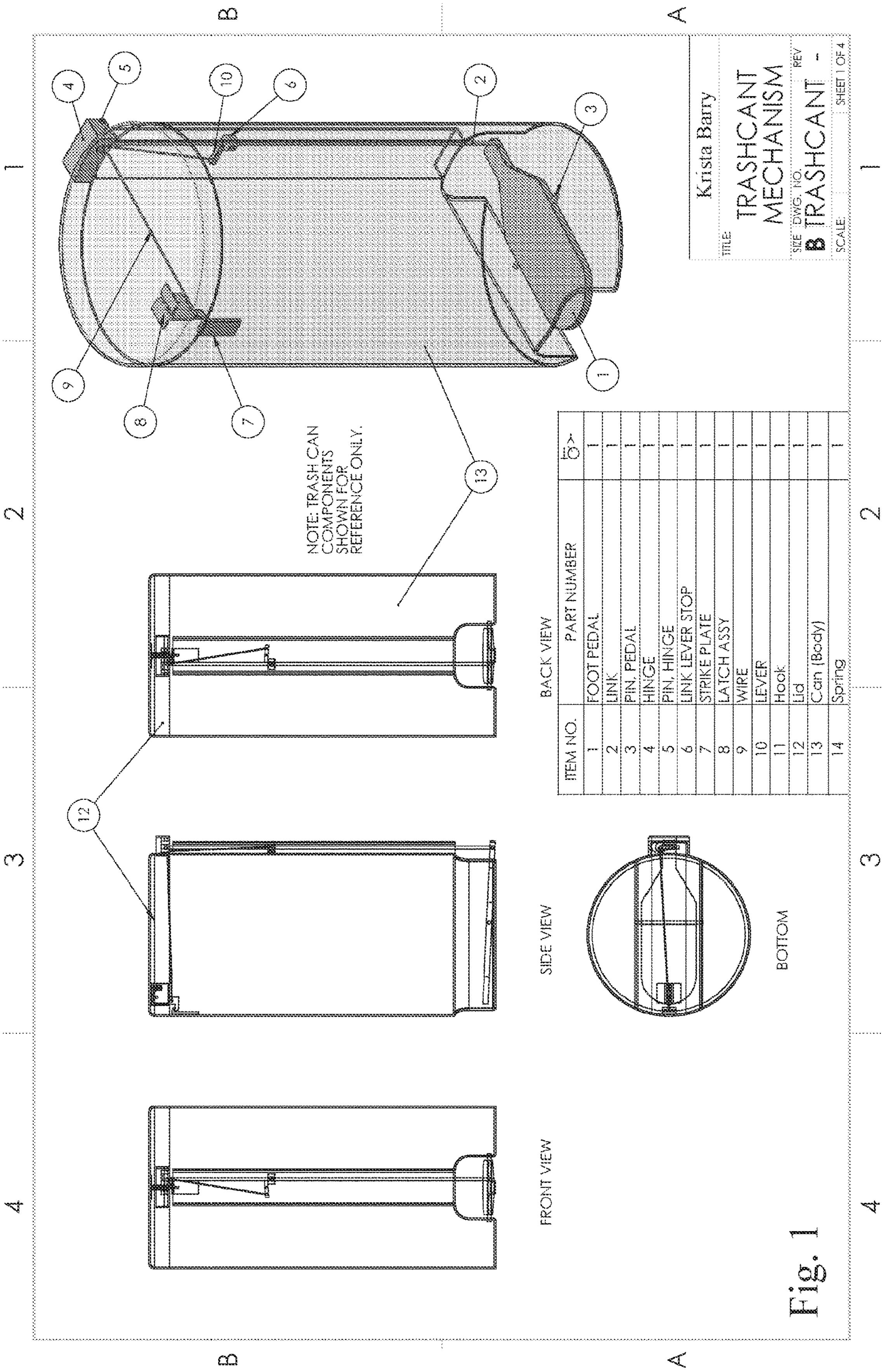
FIG. 1 is a schematic diagram according to an exemplary embodiment of the present invention.
Figure 2:
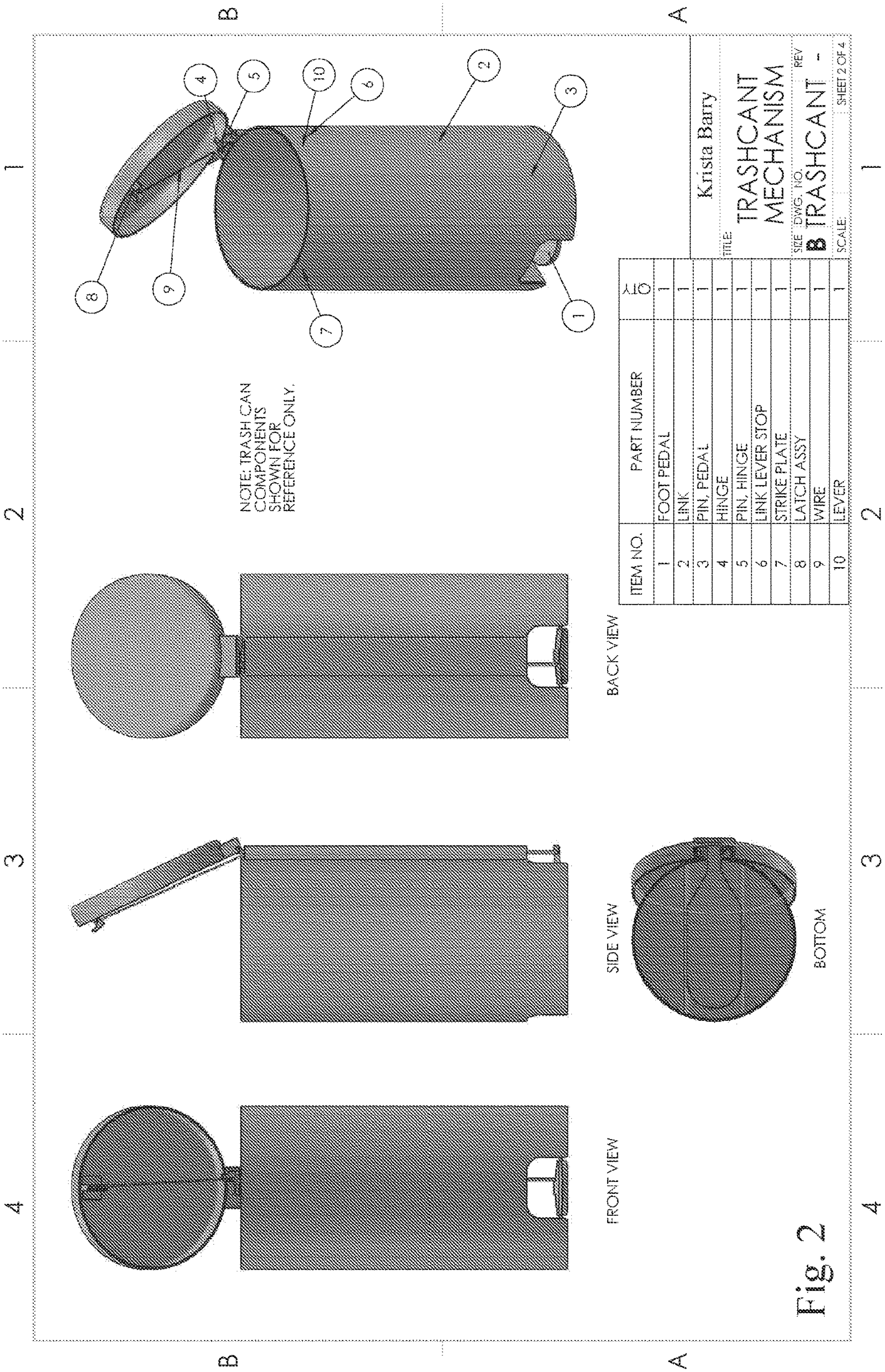
FIG. 2 is a schematic diagram according to an exemplary embodiment of the present invention.

The following description is not meant to limit the scope and breadth of the invention but to illustrate the general principles of the disclosure, since the scope of the disclosure is best defined by the recited claims. Various inventive features, functions and aspects of the disclosure are described below that can each be used independently of one another or in combination with other features, functions and aspects.

Broadly, embodiments of the present disclosure generally provide an improved pedal operated trash can that is designed to open when a force is continuously applied to the foot pedal of the trash can and close and lock when the force discontinues. In one embodiment, as shown by FIGS. 1 to 4, the disclosed trash can primarily comprises a lid 12, a can body 13, a foot pedal 1, an elongated link member 3 (i.e., a rod), a hinge 4, a strike plate 7, a latch assembly 8, a wire 9, a lever 10 and a lever stopper 6.

The can body 13 is designed to have an opening on top for receiving trashes and is connected to the lid 12 on an edge of the opening through the hinge 4. The lid 12 will seal the opening when it is in a closed position.

Figure 3:
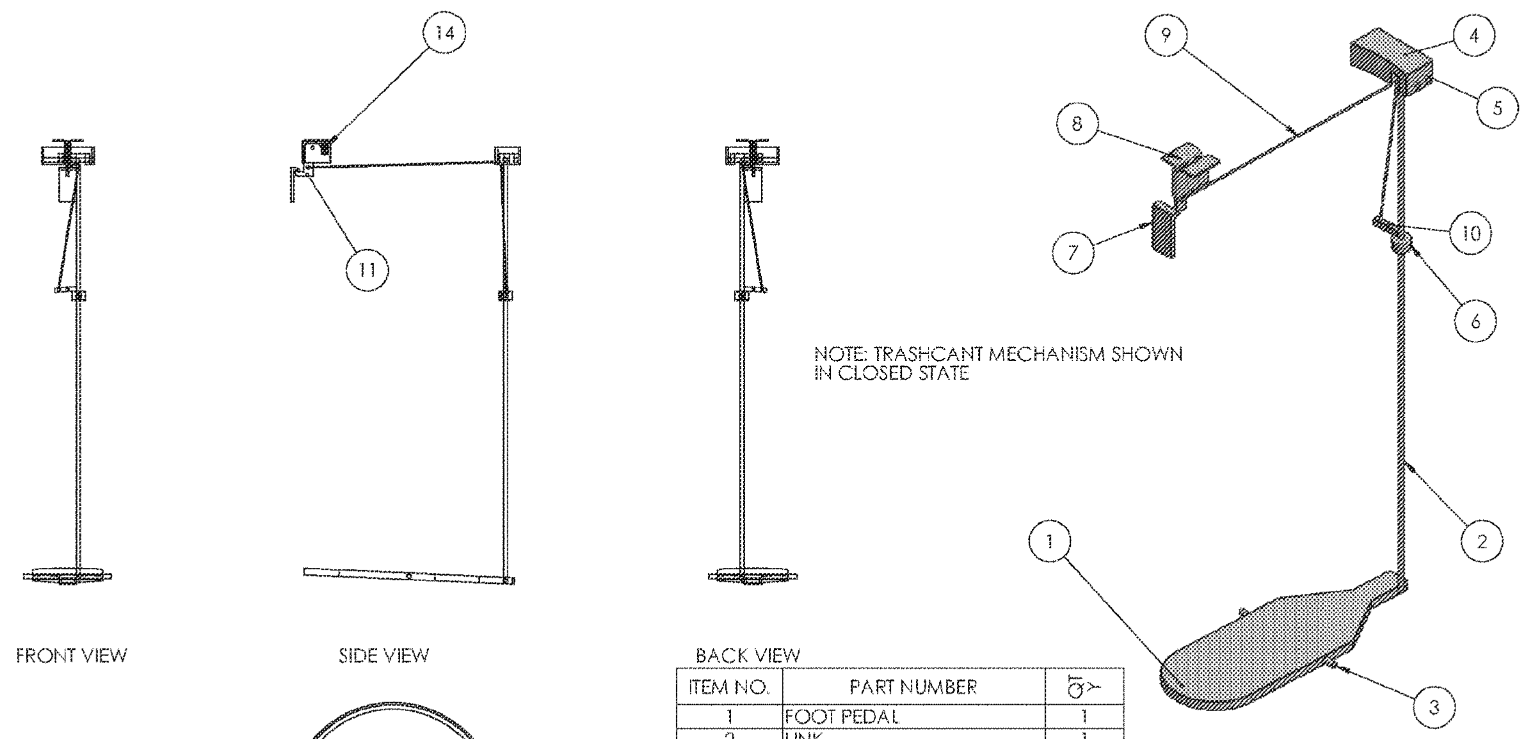
FIG. 3 is a schematic diagram according to an exemplary embodiment of the present invention.
Figure 3:
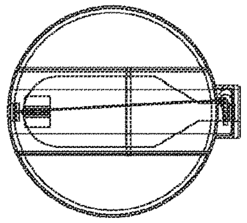
Figure 4:
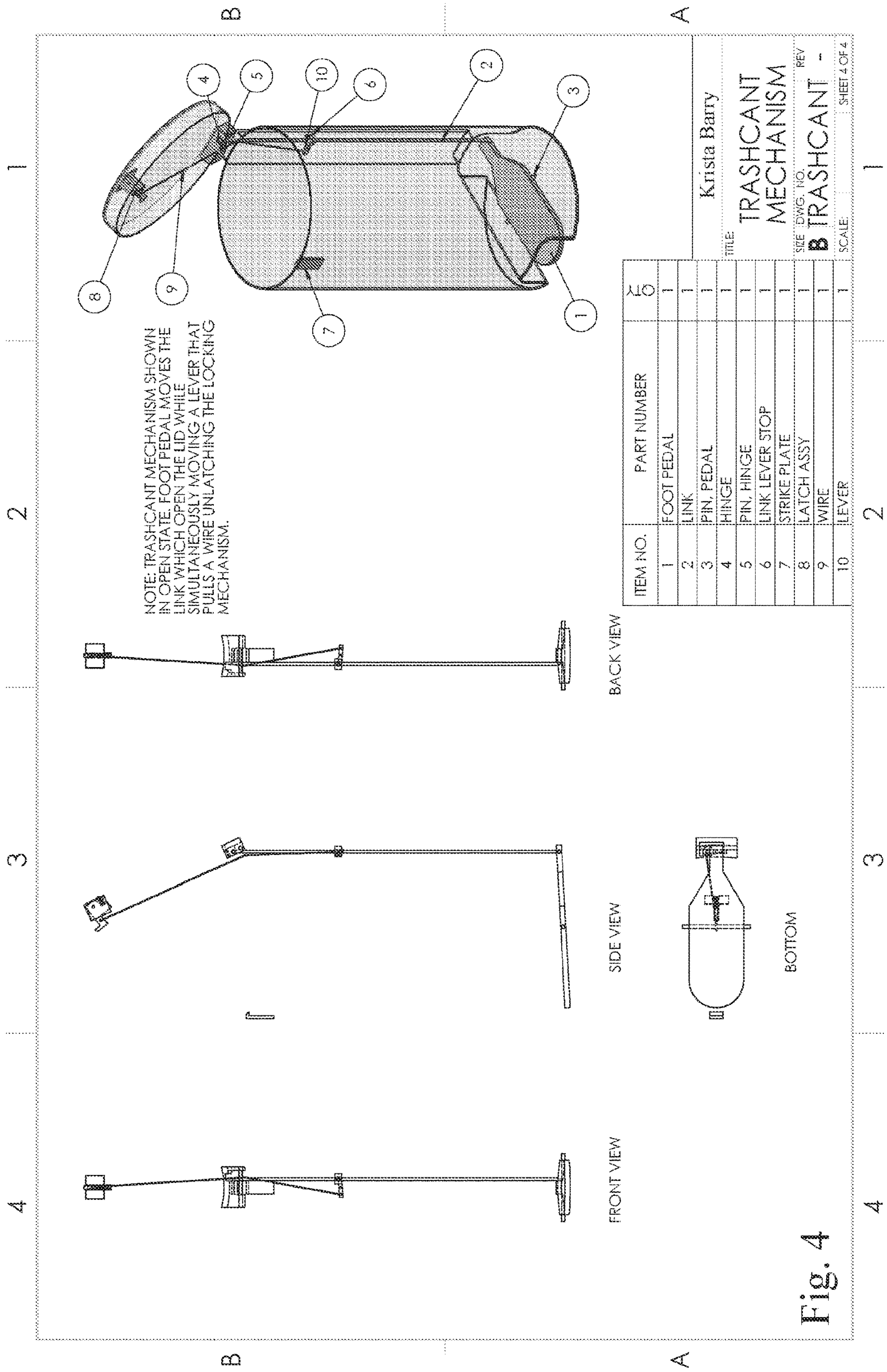
FIG. 4 is a schematic diagram according to an exemplary embodiment of the present invention.

The latch assembly 8 is located on an inner edge of the lid 12 and comprises a hook 11 and a spring 14 as shown by FIGS. 1, 3 and 4, where the spring 14 is configured to push the hook 11 to a locking position. The strike plate 7 is located on an inner surface of the can body 13 near the opening and opposite of the hinge 4, where the hook 11 of the latch assembly 8 is configured to engage the strike plate 7 to latch the lid 12 when the lid 12 is in the close position.

The pedal 1 is located near and installed on the bottom of the can body 13 and is configured in a way that when the pedal 1 is being stepped on or pushed down on a first end, a second end of the pedal 1 opposite of the first end will be lifted. The elongated link member 2 connects the second end of the pedal 1 in one end and the hinge 4 at another end. When the second end of the pedal 1 is lifted, the hinge 4 will be actuated by the pedal 1 through the elongated link member 2 and an opening force is also provided to the lid 12 through the hinge 4. Preferably, the can body 13 is designed to comprise a channel at the bottom where the pedal 1 is configured to recess and conceal within the channel. Further, the pedal 1 should also not extend beyond the sidewall of the can body 13. Such configuration makes it difficult for animals to step on the pedal accidentally or continuously.

The lever 10 is located in proximity to the elongated link member 2 and is connected to the hook 11 of the latch assembly 8 through the wire 9. Wire 9 also runs through the hinge 4 and is configured to provide a closing force to the hinge 4 (or the lid 12) when the trash can is closed. This closing force primarily comes from the spring 14. Since the hook 11 is connected to the wire 9 and the spring 14 continuously pushes the hook 11 to the locking position, which is a direction away from the hinge 4, the wire 9 in turn will be pulled towards the direction of the strike plate 7 and away from the hinge 4 when no force is applied to the pedal 1. Such configuration provides the closing force required for the lid 12 so the lid 12 is capable of closing or remain closed even when the trash can is not in an upright position or has been knocked down. In other words, unlike conventional pedal trash cans, the lid 12 of the present disclosure does not have to rely on the weight (i.e., gravitational force) of the lid 12 to close.

When a force is applied to the pedal 1, the elongated link member 2 will be lifted and the lever stopper 6, which stopper is optionally adjustable, on the elongated link member 2 will contact and trigger the lever 10 as shown by FIGS. 3 and 4. This causes the lever 10 to pull the wire to a direction opposite of the elongated link member 2 (or direction towards bottom) and pull the hook 11 away from the strike plate 7 to unlock the latch. At the same time, the lifting of the elongated link member 2 also actuates the hinge 4 and provides an opening force for the hinge 4 (or to the lid 12). Thus, the lid 12 will remain in the open position as long as a force is applied to the pedal 1 but will close once the force discontinues.

In yet another preferred embodiment, the pedal includes a pressure sensitive switch or sensor in communication with a motor or solenoid to activate a latch or switch, which, in turn, causes the lid to open.

In yet another preferred embodiment of the present disclosure, the disclosed pedal can be replaced with a motion sensor or a push button that would activate the sensor.

In yet another preferred embodiment of the present disclosure, additional weights can be placed on the bottom of the can body 13 to increase the stability of the trash can so it is more resistant to tipping. Additional weight can also be applied to the lid 12 to provide additional closing force through gravity to seal the can body 13.

In yet another preferred embodiment of the present disclosure, the can body 13 and optionally the lid 12 is made of stainless steel.

In yet another embodiment of the present disclosure, the disclosed trash can further comprises a means for attaching a smell to the trash can or eliminate the smell within the trash can to further prevent animals from tampering the trash can. For examples, the lid 12 can be configured in a way to include a small chamber for holding or filling fragrance oils, odor eliminators or animal repellent. If the animals cannot smell the food within the trash can or if they smell the animal repellent, they are less likely to approach the trash can in the first place, thereby enhancing the animal-proof feature of the disclosed trash can. Alternatively, the shell of trash can body 13 or the lid 12 can be designed include multiple layers where there is a layer for injecting a scent or odor-deterrent material. For instance, the trash can body could have a steel layer outside and a plastic/urethane layer inside, and between the steel layer and the plastic/urethane layer there is a space for injecting a scent or odor deterrent material.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A trash can with auto lid locking mechanism, the trash can comprising:

a can body with an opening for receiving trash;

a lid connected to the can body by way of a hinge, the lid being movable about the hinge between a closed position and an open position with respect to the can body, wherein the lid is configured to seal the opening when in the closed position;

a latch assembly configured to have a lock position and an unlock position;

an actuation subsystem including (a) a pedal configured to cause activation of the actuation subsystem when an activation force is applied to the pedal, (b) an elongated link member in mechanical communication between the pedal and the hinge, the elongated link member being configured to receive a lifting force and thereby impart an opening force on the lid when the actuation subsystem is activated, and (c) a wire in mechanical communication between the pedal and the latch assembly;

wherein (a) the latch assembly is configured to lock the lid in the closed position by engaging an inner surface of the can body proximate the opening when the lid is in the closed position and the latch assembly is in the lock position, (b) activation of the actuation subsystem results in (i) the latch assembly moving to the unlock position by way of the wire, and (ii) the lid moving to the open position by way of the elongated link member, and (c) removal of the activation force from the pedal is sufficient to cause the lid to move to the closed position and the latch assembly to move to the lock position.

2. The trash can of claim 1, wherein the pedal is configured not to extend beyond a side wall of the can body.

3. The trash can of claim 2, wherein (a) the can body includes a channel, and (b) the pedal is recessed within the channel.

4. The trash can of claim 1, wherein
(a) a strike plate is located on an inner surface of the can body, and
(b) the latch assembly is configured to engage the strike plate when the lid is in the closed position and the latch assembly is in the lock position.

5. The trash can of claim 1, wherein deactivation of the actuation subsystem results in the lid automatically returning to the closed position and the latch assembly automatically moving to the lock position.

6. The trash can of claim 1, wherein
(a) the latch assembly is affixed to the lid, and
(b) at least a portion of the wire extends through lid.

7. The trash can of claim 6, wherein the engagement of the latch assembly with an inner surface of the can body occurs between
(a) a portion of the lid distal the hinge and
(b) a portion of the opening distal the hinge.

8. A trash can comprising:
a can body with an opening for receiving trash;
a lid connected to the can body by way of a hinge, the lid being movable about the hinge between a closed position and an open position with respect to the can body, wherein the lid is configured to seal the opening when in the closed position;
a latch assembly configured to have a lock position and an unlock position;
a pedal configured to be moved to an activated position by way of an activation force applied by a user's foot;
an elongated link member in mechanical communication between the pedal and the hinge; and
a wire in mechanical communication between the pedal and the latch assembly;
wherein
(a) the latch assembly is configured to lock the lid in the closed position when the lid is in the closed position and the latch assembly is in the lock position,
(b) movement of the pedal to the activation position causes
(i) the wire to move the latch assembly to the unlock position, and
(ii) the elongated link member to move the lid to the open position, and
(c) removing the activation force from the pedal is sufficient to cause the lid to move to the closed position and the latch assembly to move to the lock position.

9. The trash can of claim 8, wherein the wire extends through at least a portion of the lid between the hinge and the latch assembly.

10. The trash can of claim 9, wherein
(a) the lid has
(i) a rear edge proximal the hinge, and
(ii) a front edge opposite of the rear edge; and
(b) the latch assembly is disposed closer to the front edge than the rear edge.

11. The trash can of claim 9 wherein the latch assembly is spring biased toward the lock position.

* * * * *